United States Patent
White et al.

(10) Patent No.: US 9,099,871 B2
(45) Date of Patent: Aug. 4, 2015

(54) MODULE BYPASS SWITCH FOR BALANCING BATTERY PACK SYSTEM MODULES

(75) Inventors: David A. White, Houston, TX (US); Claude L. Benckenstein, Jr., Stafford, TX (US)

(73) Assignee: SOUTHWEST ELECTRONIC ENERGY CORPORATION, Missouri City, TX (US)

( * ) Notice: Subject to any disclaimer, the term of this patent is extended or adjusted under 35 U.S.C. 154(b) by 537 days.

(21) Appl. No.: 12/899,413

(22) Filed: Oct. 6, 2010

(65) Prior Publication Data
US 2012/0086400 A1    Apr. 12, 2012

(51) Int. Cl.
*H02J 7/00* (2006.01)
(52) U.S. Cl.
CPC ..................... *H02J 7/0016* (2013.01)
(58) Field of Classification Search
CPC ....................................................... H02J 7/0016
USPC .................................. 320/116, 118, 120, 122
See application file for complete search history.

(56) References Cited

U.S. PATENT DOCUMENTS

| | | | |
|---|---|---|---|
| 5,710,501 A | | 1/1998 | van Phuoc et al. |
| 5,773,962 A | * | 6/1998 | Nor ............................... 320/134 |
| 5,952,815 A | | 9/1999 | Rouillard et al. |
| 5,998,967 A | * | 12/1999 | Umeki et al. ................. 320/122 |
| 6,157,169 A | | 12/2000 | Lee |
| 6,160,375 A | | 12/2000 | Horie et al. |
| 6,265,846 B1 | * | 7/2001 | Flechsig et al. ............... 320/116 |
| 6,288,489 B1 | | 9/2001 | Isohata et al. |
| 7,157,881 B1 | | 1/2007 | Benckenstein, Jr. et al. |
| 7,199,556 B1 | | 4/2007 | Benckenstein, Jr. et al. |
| 7,274,170 B2 | | 9/2007 | Benckenstein, Jr. et al. |
| 7,279,867 B2 | | 10/2007 | Benckenstein, Jr. et al. |
| 7,456,610 B2 | * | 11/2008 | Yamashita .................... 320/119 |

(Continued)

FOREIGN PATENT DOCUMENTS

EP            2124314 A2    11/2009
WO    WO-2009142652 A1    11/2009

OTHER PUBLICATIONS

Program for Battery Power 2011, Sep. 20-21, 2011, in Nashville, TN, available at http://www.batterypoweronline.com/bppt-conf11/bp11_program.php.

(Continued)

*Primary Examiner* — Yalkew Fantu
*Assistant Examiner* — Manuel Hernandez
(74) *Attorney, Agent, or Firm* — Norton Rose Fulbright US LLP

(57) ABSTRACT

A battery pack system module may include a module bypass switch for allowing charge current to bypass the battery pack system module. A charge switch and a discharge switch may be coupled with the module bypass switch. When other battery pack system modules are coupled in series with the module, balancing between modules may be achieved by allowing charge current to bypass the unbalanced modules and charge other modules. For example, when an unbalanced module is at a higher level of charge than other modules, a charge switch and a discharge switch in the unbalanced module de-activate and a module bypass switch activates to allow charge current to rapidly bring other modules into balance. The discharge switch and the charge switch allow the charging current to bypass the unbalanced module creating little or no additional heat dissipation.

19 Claims, 8 Drawing Sheets

(56) References Cited

U.S. PATENT DOCUMENTS

| | | |
|---|---|---|
| 7,486,050 B2 | 2/2009 | Hidaka et al. |
| 7,609,031 B2 | 10/2009 | Benckenstein et al. |
| 7,755,326 B1 | 7/2010 | Thivierge |
| 7,880,434 B2 | 2/2011 | White et al. |
| 2002/0171390 A1 | 11/2002 | Kruger et al. |
| 2004/0036446 A1* | 2/2004 | Iwashima ............... 320/116 |
| 2005/0068005 A1* | 3/2005 | Yamashita ............... 320/116 |
| 2005/0083016 A1* | 4/2005 | Yau et al. ............... 320/116 |
| 2006/0091854 A1* | 5/2006 | Chen et al. ............... 320/116 |
| 2006/0103351 A1* | 5/2006 | Tanigawa et al. ............... 320/118 |
| 2008/0252263 A1 | 10/2008 | Funabashi et al. |
| 2009/0096420 A1* | 4/2009 | Lupu et al. ............... 320/122 |
| 2009/0251100 A1 | 10/2009 | Incledon et al. |
| 2011/0089901 A1 | 4/2011 | White et al. |
| 2011/0109270 A1* | 5/2011 | Nakao ............... 320/116 |
| 2011/0140650 A1* | 6/2011 | Zhang et al. ............... 320/103 |
| 2012/0274283 A1* | 11/2012 | van Lammeren ............... 320/118 |

OTHER PUBLICATIONS

Presentation at Battery Power 2011 on Sep. 21, 2011, of "A Self-Reconfigurable Multicell Battery with Series Cell Connections" by T. Kim, W. Qiao, and L. Qu.

\* cited by examiner

MODULE BYPASS SWITCH FOR BALANCING BATTERY PACK SYSTEM MODULES

TECHNICAL FIELD

The present disclosure generally relates to a system for balancing a plurality of battery pack system modules.

BACKGROUND

A device powered by rechargeable batteries may include several battery cells to achieve the voltage and/or current levels used by the device. For example, if a rechargeable battery cell has a nominal output voltage of 1 Volt, the a device having a 2 Volt operational level may include two battery cells placed in series. In another example, if a rechargeable battery cell has a nominal output current of 100 milliamps, then a device having a 400 milliamp operational level may include four battery cells in parallel. Battery cells in parallel and series may be combined to reach the operational levels of the device.

The battery cells may be grouped with circuitry for balancing the charge levels in the battery cells to form a battery pack system module. Multiple battery pack system modules may be combined in series or parallel to further increase the output voltage and output current available to a device coupled to the battery pack system modules. Although battery cells within a battery pack system module may be balanced by using balancing circuitry within the battery pack system module (referred to as intra-module balancing), there is a need for balancing battery pack system modules to other battery pack system modules (referred to as inter-module balancing).

One conventional solution for providing inter-module balancing includes shorting out a battery pack system module within a battery pack system with a bypass switch. FIG. 1 is a block diagram illustrating a conventional battery pack system module with a bypass switch. A battery pack system 100 includes battery pack system modules 110, 130. The module 110 includes a first group of battery cells 114 having a battery cell 116 coupled in parallel with a battery cell 118. The module 110 also includes a second group of battery cells 124 having a battery cell 126 coupled in parallel with a battery cell 128. The first group 114 is coupled in series with the second group 124.

When a bypass switch 112 activates, current through the module 110 is diverted away from the battery cells 116, 118, 126, and 128. To prevent short circuiting of the battery cells 116, 118, 126, and 128, a resistor 120 is coupled in series with the switch 112. However, the resistor 120 consumes power and generates heat in the system 100 through Joule heating. The heat generated by the resistor 120 may result in dangerous conditions within the system 100. For example, the heat may lead to a fire involving the battery cells 116, 118, 126, and 128.

Heat generated by the resistor 120 may be problematic where the system 100 is operating in an isolated environment. For example, on an undersea vehicle such as a submarine, battery pack systems may be isolated in a pressurized compartment. Thus, heat dissipated by the resistor 120 may not be carried away and result in dangerous conditions for the vehicle and operator of the vehicle.

Additionally, when one of the modules 110 or 130 of the system 100 becomes defective, the defective module may be replaced with a new module. The new module may be at a significantly different charge than existing modules of the system 100. In a conventional system, balancing of the replacement module with the existing modules may occur over a long period taking days or weeks to reach balance. During this time the system 100 may be unavailable for use. In the above example if one module in the vehicle is replaced, the vehicle may not be ready for operation until the modules are fully-charged and balanced. If the balancing operation consumes days or weeks, the vehicle may be out of service for this entire time period.

SUMMARY

According to one embodiment, an apparatus includes a first battery pack system module. The module includes a battery cell coupled between a first terminal and a second terminal. The module also includes a charge switch coupled in series with the battery cell and the first terminal for interrupting charging of the battery cell. The module further includes a discharge switch coupled in series with the charge switch and the first terminal for interrupting discharging of the battery cell. The module also includes a module bypass switch for shorting the first terminal and the second terminal.

According to another embodiment, a method includes charging a first battery pack system module with a charging current. The method also includes detecting, during the charging, that the first battery pack system module has reached a first criteria. The method further includes stopping charging of the first battery pack system module after detecting the first battery pack system module has reached the first criteria. The method also includes stopping discharging of the first battery pack system module after detecting the first battery pack system module has reached the first criteria. The method further includes activating a module bypass switch to pass the charging current through the first battery pack system module without charging the first battery pack system module after stopping discharging of the first battery pack system module.

According to yet another embodiment, a computer program product includes a computer-readable medium having code to monitor a first battery pack system module. The medium also includes code to disable charging of the first battery pack system module when a first criteria is met. The medium further includes code to disable discharging of the first battery pack system module when a first criteria is met. The medium also includes code to enable passing charge current through the first battery pack system module when the first criteria is met. The medium further includes code to re-enable charging of the first battery pack system module when a second criteria is met.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiments disclosed may be readily used as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings.

DETAILED DESCRIPTION

Figure 1:
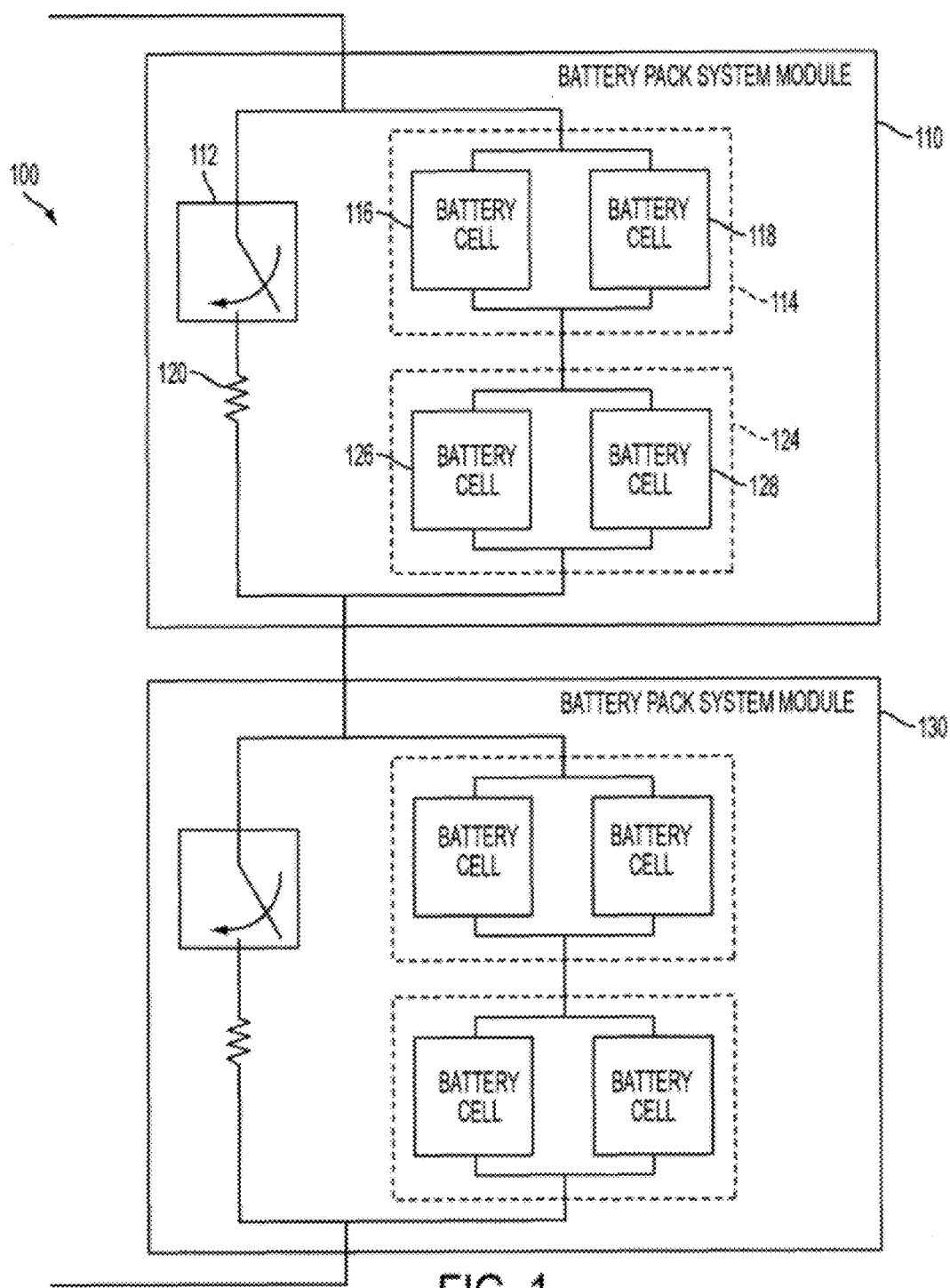
FIG. 1 is a block diagram illustrating a conventional battery pack system module with a bypass switch.

A battery pack system having a plurality of battery pack system modules may be balanced by including a module bypass switch, a charge switch, and a discharge switch in the battery pack system modules. A charge switch within the battery pack system module may be used to prevent charge current from passing through the battery cells of the battery pack system module. When one battery pack system module of a battery pack system is unbalanced with other battery pack system modules of the battery pack system, the module bypass switch may be activated to allow charge current to bypass the unbalanced battery pack system module or modules. A discharge switch within the battery pack system module may be used to prevent discharge current from passing through the battery cells of the battery pack system module when the bypass module switch is activated.

De-activation of the discharge switch in the battery pack system module prevents shorting of the battery cells in the battery pack system module, which would otherwise occur when the bypass module switch is activated. Because the discharge switch physically disconnects the battery cells from terminals of the battery pack system module, little to no power is dissipated during inter-module balancing when the bypass module switch is activated. The reduction in the dissipated power reduces heat generated in the battery pack system module, and reduces safety hazards experienced by the battery pack system and the operator of a device including the battery pack system.

The module bypass switch enables rapid balancing of battery pack system modules within a battery pack system without time-consuming and costly maintenance operations. Because the battery pack system modules are balanced during each charging of the battery pack system, the operation of the battery pack system presents reduced safety hazards to operators of equipment including the battery pack system. That is, over-charging of battery pack system modules within the battery pack system is reduced or eliminated, which reduces fire hazards in the battery pack system. Additionally, the balancing of the battery pack system modules through inter-module balancing during charging operations extends the life of the battery pack system modules and reduces replacements costs for operating equipment including the battery pack system module.

Balancing battery pack system modules through the module bypass switch allows balancing to occur faster than in conventional battery balancing techniques. Conventional battery balancing devices may re-direct charging currents on the order of hundreds of milliAmps. By providing a low resistance path through the module bypass switch, the magnitude of re-directed current may be many times higher, such as 10 to 100 Amps. Thus, when a battery pack system module is out of balance from other battery pack system modules in a battery system, the balancing operation is completed faster. For example, a balancing operation that may take several hundred hours under a conventional balancing system may be completed in several hours or less.

Figure 2:
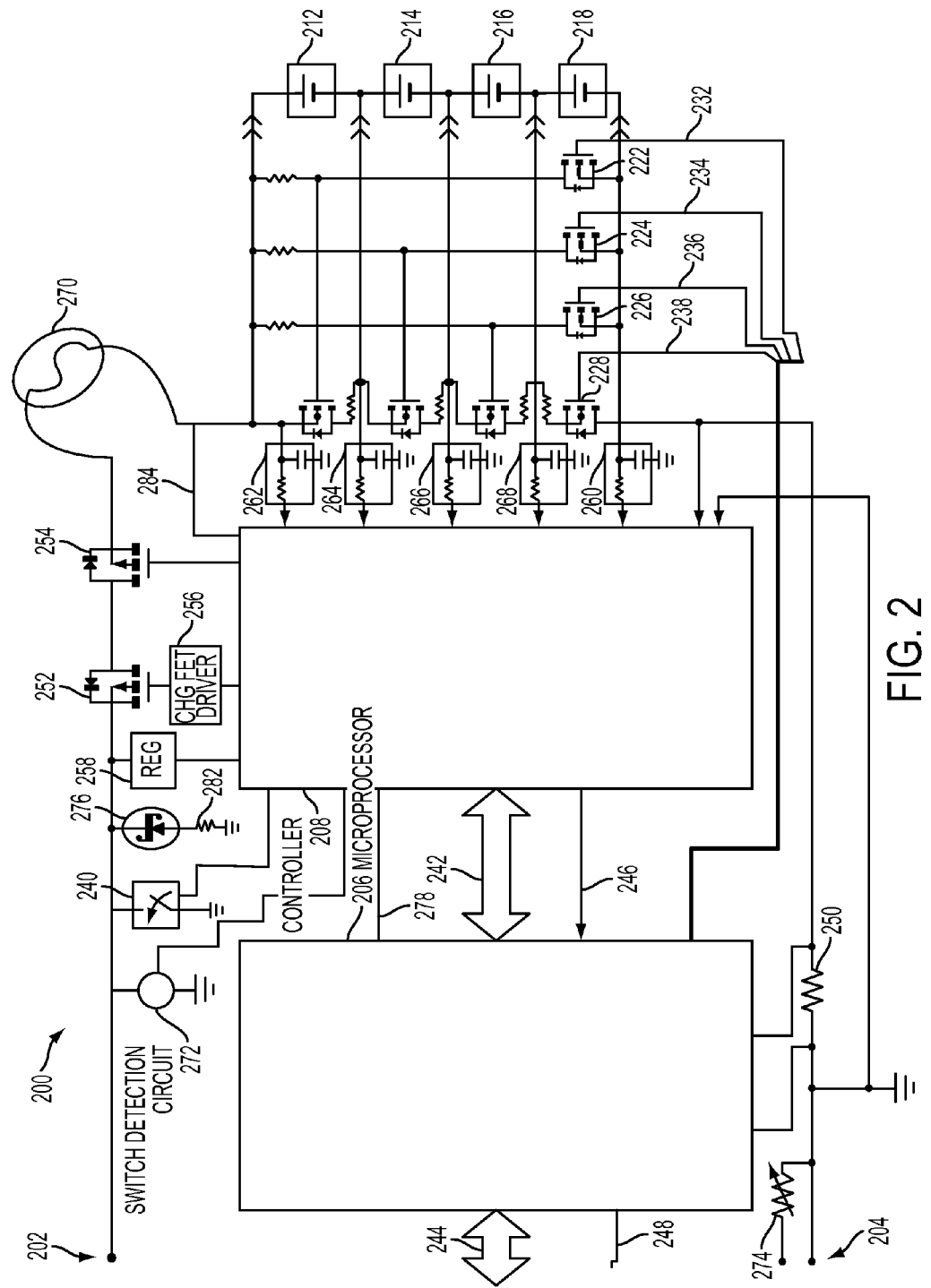
FIG. 2 is a circuit schematic illustrating an exemplary battery pack system module having charge, discharge, and bypass module switches according to one embodiment.

FIG. 2 is a circuit schematic illustrating an exemplary battery system module having charge, discharge, and bypass module switches according to one embodiment. Battery cells 212, 214, 216, and 218 are coupled in series with each other. Although not shown, additional battery cells may be coupled in series or in parallel with the battery cells 212, 214, 216, and 218. A positive battery terminal 202 and a negative battery terminal 204 are coupled with the battery cells 212, 214, 216, and 218. According to one embodiment, a load (not shown) may be coupled between the terminals 202 and 204 to receive an output voltage and/or output current from the battery cells 212, 214, 216, and 218.

According to another embodiment, the terminals 202 and 204 may be coupled to other battery pack system modules in parallel or series (as shown below with reference to FIG. 3). According to one embodiment, the battery cells 212, 214, 216, and 228 may be electrochemical cells such as lithium ion (Li-ion) battery cells, nickel-metal hydroxide (NiMH) battery cells, nickel cadmium (NiCd) battery cells, lead-acid battery cells, or a combination thereof. The battery cells may also include capacitors or super capacitors.

Balancing enable transistors 222, 224, 226, and 228 activate intra-cell balancing for each of the battery cells 212, 214, 216, and 218, respectively. For example, when balancing enable transistor 222 is activated the battery cell 212 may discharge through a resistor to balance with the battery cells 214, 216, and 218. Each of the balancing enable transistor 222, 224, 226, and 228 may be controlled through balancing enable signals 232, 234, 236, and 238, respectively. The balancing enable signals 232, 234, 236, and 238 may be controlled by a microprocessor 206. Further details of intra-module balancing within a battery pack system module is described in U.S. patent application Ser. No. 12/195,274 (published as U.S. Patent Application Publication No. 2008/0309288) entitled "Method for Balancing Lithium Secondary Cells and Modules" filed on Aug. 20, 2008, to Benckenstein et al., which is hereby incorporated by reference.

An analog controller 208 measures characteristics and current status of the battery cells 212, 214, 216, and 218 through circuits 260, 262, 264, 266, and 268. According to one embodiment, the circuits 260-268 are a combination of a resistor and a capacitor such as an RC circuit. The analog controller 208 may be powered by the battery cells 212, 214, 216, and 218 through a line 284 and/or through an external charger (not shown) through a voltage regulator 258. The microprocessor 206 may enable or disable the balancing enable signals 232, 234, 236, and 238 by receiving information about the battery cells 212, 214, 216, and 218 from the analog controller 208 through a communication bus 242 such as an I²C bus. The microprocessor 206 may also receive information from the analog controller 208 through an analog signal 246. According to one embodiment, the microprocessor 206 is powered by a voltage regulator within the analog controller 208 through a line 278.

According to one embodiment, the microprocessor 206 may issue commands to the analog controller 208 through the bus 242 for the analog controller 208 to output signals on the analog line 246 proportional to the output voltage of one of the battery cells 212, 214, 216, and 218 and read battery cell voltages from the analog line 246. An analog/digital converter (not shown) may be coupled between the microprocessor 206 and the analog line 246. The analog/digital converter may have a resolution selected to match a desired sensitivity for receiving voltages from the analog controller 208. For example, the analog/digital converter may be an 8-bit, 12-bit, 16-bit, 20-bit, or 24-bit converter.

A zener diode 276 and a current limiting resistor 282 may be coupled between the terminals 202 and 204 to allow low current inter-module balancing between the battery pack system module 200 and other battery pack system modules (not shown). Further details of inter-module balancing with the zener diode 276 and current limiting resistor 282 is described in U.S. patent application Ser. No. 12/417,435 (published as U.S. Patent Application Publication No. 2009/0289599) entitled "System for Balancing a Plurality of Battery Pack System Modules Connected in Series" filed on Apr. 2, 2009, to White et al., which is hereby incorporated by reference.

A discharge switch 254 may be coupled in series with the battery cells 212, 214, 216, and 218 and the terminal 202. According to one embodiment, the discharge switch 254 is a field effect transistor (FET) having its body diode oriented to block discharge current from the battery cells 212, 214, 216, and 218. The discharge switch may be controlled by the analog controller 208.

A charge switch 252 may be coupled in series with the battery cells 212, 214, 216, and 218 and the terminal 202. According to one embodiment, the charge switch 252 is a FET having its body diode oriented to block charge current to the battery cells 212, 214, 216, and 218. The charge switch may be controlled by the analog controller 208. According to one embodiment, a driver 256 is coupled between the charge switch 252 and the analog controller 208.

A module bypass switch 240 may be coupled in parallel with the terminals 202 and 204 such that when the switch 240 is activated, substantially all current through the battery pack system module 200 flows through the switch 240. According to one embodiment, the switch 240 is a FET controlled by the analog controller 208. The switch 240 may be activated when other battery pack system modules (not shown) in a battery pack system are unbalanced with the module 200. For example, when the battery pack system module 200 is charged to a higher level of charge than other battery pack system module coupled to the module 200, the module bypass switch 240 may be activated to supply charge current to other modules to bring the other modules into balance with the module 200.

Inter-module balancing may be performed by de-activating the charge switch 252 to reduce to little or none the charging current flowing through the battery cells 212, 214, 216, and 218. After the charge switch 252 is de-activated inter-module balancing may be performed through the diode 276. Higher inter-module balancing currents may be obtained by activating the module bypass switch 240. Before the switch 240 is activated, the discharge switch 254 may be de-activated to prevent shorting of the battery cells 212, 214, 216, and 218. After de-activating the discharge switch 254, the module bypass switch 240 may be activated to allow charging current to bypass the module 200. After the module 200 has reached balance with other modules in the battery pack system, the module bypass switch 240 may be de-activated followed by activation of the charge switch 252 and of the discharge switch 254.

The charge switch 252, the discharge switch 254, and the module bypass switch 240 may be controlled through the analog controller 208 by the microprocessor 206. For example, the microprocessor 206 may issue commands over the bus 242 to activate or de-activate the switches 252, 254, and 240. The microprocessor 206 may issue commands to maintain balance between the battery pack system module 200 and other battery pack system modules. According to one embodiment, the microprocessor 206 is configured with information about the battery cells 212, 214, 216, and 218 and/or applications for using the module 200. For example, the microprocessor 206 may have information regarding open circuit voltage curves for and/or physical chemistry of the battery cells 212, 214, 216, and 218. According to another embodiment, the microprocessor 206 may have application information such as whether the module 200 is configured for use in a vehicle including load information. The microprocessor 206 may use the battery cell information and/or load information in determining operation of the switches 252, 254, and 240.

According to one embodiment, a fuse 270 is coupled in series between the discharge switch 254 and the battery cells 212, 214, 216, and 218. The fuse 270 prevents damage to the battery cells 212, 214, 216, and 218 in the event of a failure in the discharge switch 254.

A module bypass switch detection circuit 272 may be coupled in parallel with the module bypass switch 240. The detection circuit 272 may measure the voltage across the bypass module switch 240. The module bypass detection circuit 272 may also detect reverse voltage conditions in the battery pack system module 200. When a low state of charge is reached in the battery pack system module, the discharge switch 254 may be de-activated to prevent over discharge of the battery pack system module 200. The diode 276 may allow discharge current to continue to pass through the battery pack system module 200 after the discharge switch 254 is de-activated. This may cause a reverse voltage to develop across the diode 276. The module bypass detection circuit 272 may detect the reverse voltage condition and activate the module bypass switch 240 to allow discharge current to pass through the battery pack system module 200.

The microprocessor 206 may also monitor the battery system pack module 200 through a thermistor 274 and a current sensing resistor 250. The thermistor 274 and the current sensing resistor 250 may be included in a pack sensing circuit. The thermistor 274 allows the microprocessor 206 to monitor the temperature of the module 200. The microprocessor 206 may use information about the temperature of the module 200 to activate or de-activate the module bypass switch 240, the charge switch 252, and/or the discharge switch 254 or combinations thereof. The microprocessor 206 may also use information from the current sensing resistor 250 to monitor the charge status of the battery cells 212, 214, 216, and 218. For example, the microprocessor 206 may perform Coulomb counting with the current sensing resistor 250. The microprocessor 206 may be coupled to the thermistor 274 and the current sensing resistor 250 through an analog-to-digital converter (not shown) selected to match a desired sensitivity for measurements.

The microprocessor 206 and the analog controller 208 may form a controller assembly. The controller assembly communicates through a bus 244. The bus 244 may be, for example, an RS-232 or RS-485 bus. According to one embodiment, the microprocessor 206 receives a module enable signal 248 to enable or disable the module 200.

Figure 3:
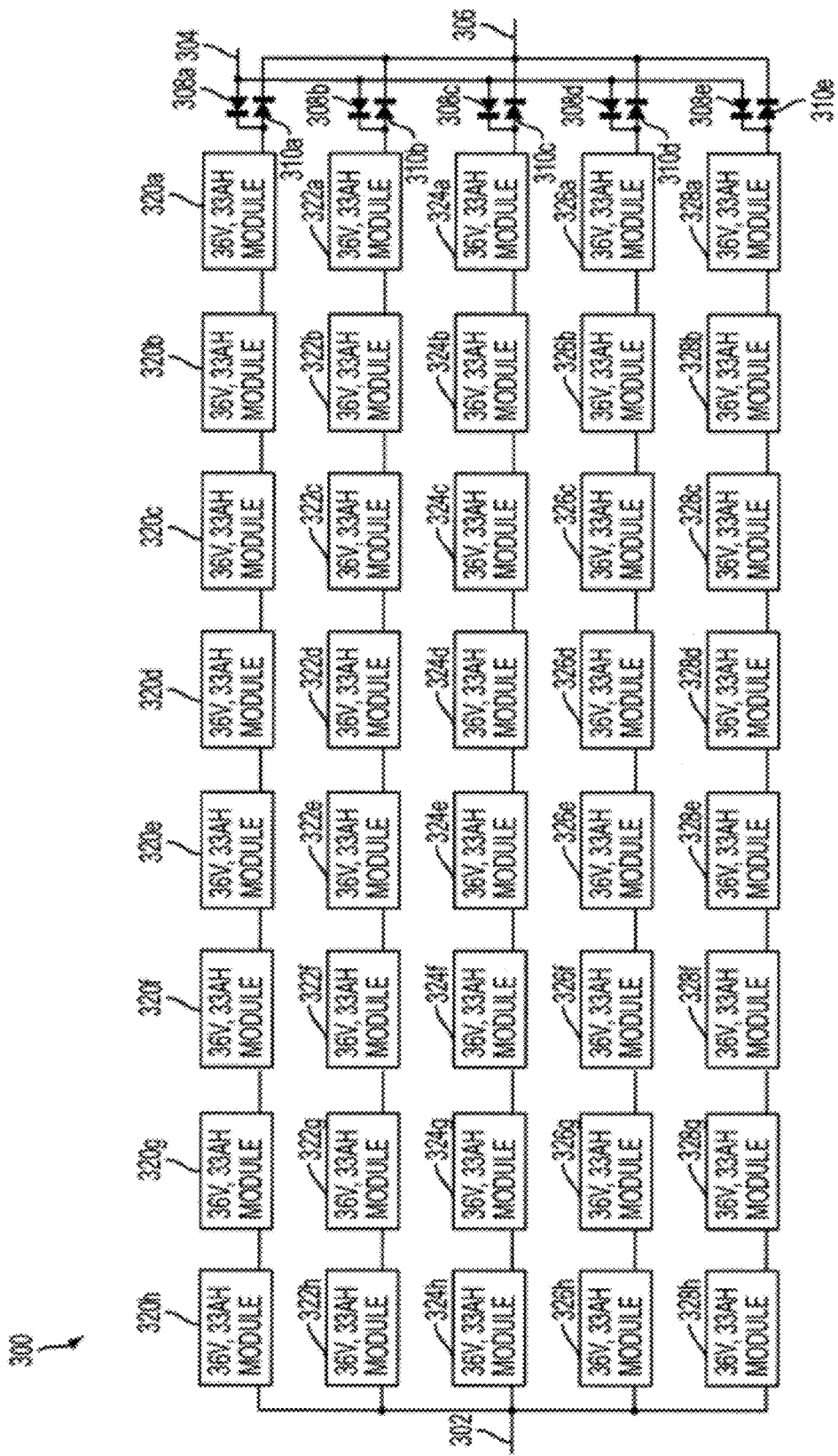
FIG. 3 is a block diagram illustrating an exemplary battery pack system having series and parallel coupled battery pack system modules according to one embodiment.

FIG. 3 is a block diagram illustrating an exemplary battery pack system having series and parallel coupled battery pack system modules according to one embodiment. A battery pack system 300 includes first modules 320a, 320b, . . . , 320h coupled in series with each other. The system 300 also includes second modules 322a, 322b, . . . , 322h, third modules 324a, 324b, . . . , 324h, fourth modules 326a, 326b, 326h, and fifth modules 328a, 328b, . . . , 328h. Each of the modules of the second modules 322 are coupled in series with each other and the third modules 324, fourth modules 326, and fifth modules 328 are similarly coupled in series. The first modules 320, second modules 322, third modules 324, fourth modules 326, and fifth modules 328 are coupled in parallel between a negative terminal 302 and a positive charge terminal 304 and a positive discharge terminal 306. Diodes 308a, 308b, . . . , 308e are coupled between the positive charge terminal 304 and the modules 320, 322, 324, 326, and 328. Diodes 310a, 310b, . . . , 310e are coupled between the positive discharge terminal 306 and the modules 320, 322, 324, 326, and 328. The diodes 308 and 310 may be isolation diodes to prevent any of the first modules 320, second modules 322, third modules 324, fourth modules 326, and fifth modules 328 from discharging any other of the modules 320, 322, 324, 326, and 328.

Each of the modules of the first modules 320, second modules 322, third modules 324, fourth modules 326, and fifth modules 328 may include a module bypass switch as described above with reference to FIG. 2 and other balancing circuits as described in U.S. patent application Ser. No. 12/417,435. Inter-module balancing may be effected through the use of the module bypass switch in the modules 320, 322, 324, 326, and 328. For example, if the module 320e is at a higher charge than the module 320d, the module 320e may de-activate a charge switch, de-activate a discharge switch, and activate a module bypass switch in the module 320e to allow charge current to flow to the module 320d. Control of inter-module balancing may be performed within each of the modules 320, 322, 324, 326, and 328 as described below with reference to FIG. 4 or by an initializer (not shown) or master battery system pack module described below with reference to FIGS. 5 and 6.

The battery pack system 300 may be charged through a power supply (not shown) coupled to the positive charge terminal 304 and the negative terminal 302. According to one embodiment, the power supply may be a constant-current constant-voltage power supply. According to other embodiments, the power supply 332 may be a fuel cell, a solar cell, or combinations thereof.

Although FIG. 3 illustrates five parallel coupled groups of eight modules, a battery pack system may incorporate any number of modules in series or parallel. The battery pack system modules in a battery pack system may be of similar capacity, similar output voltage, and/or similar output current, or have different capacities, different output voltages, and/or different output currents. Additionally, the diodes 308 and 310 of FIG. 3 may be coupled on a high potential or low potential end of the modules 320, 322, 324, 326, and 328.

Figure 4:
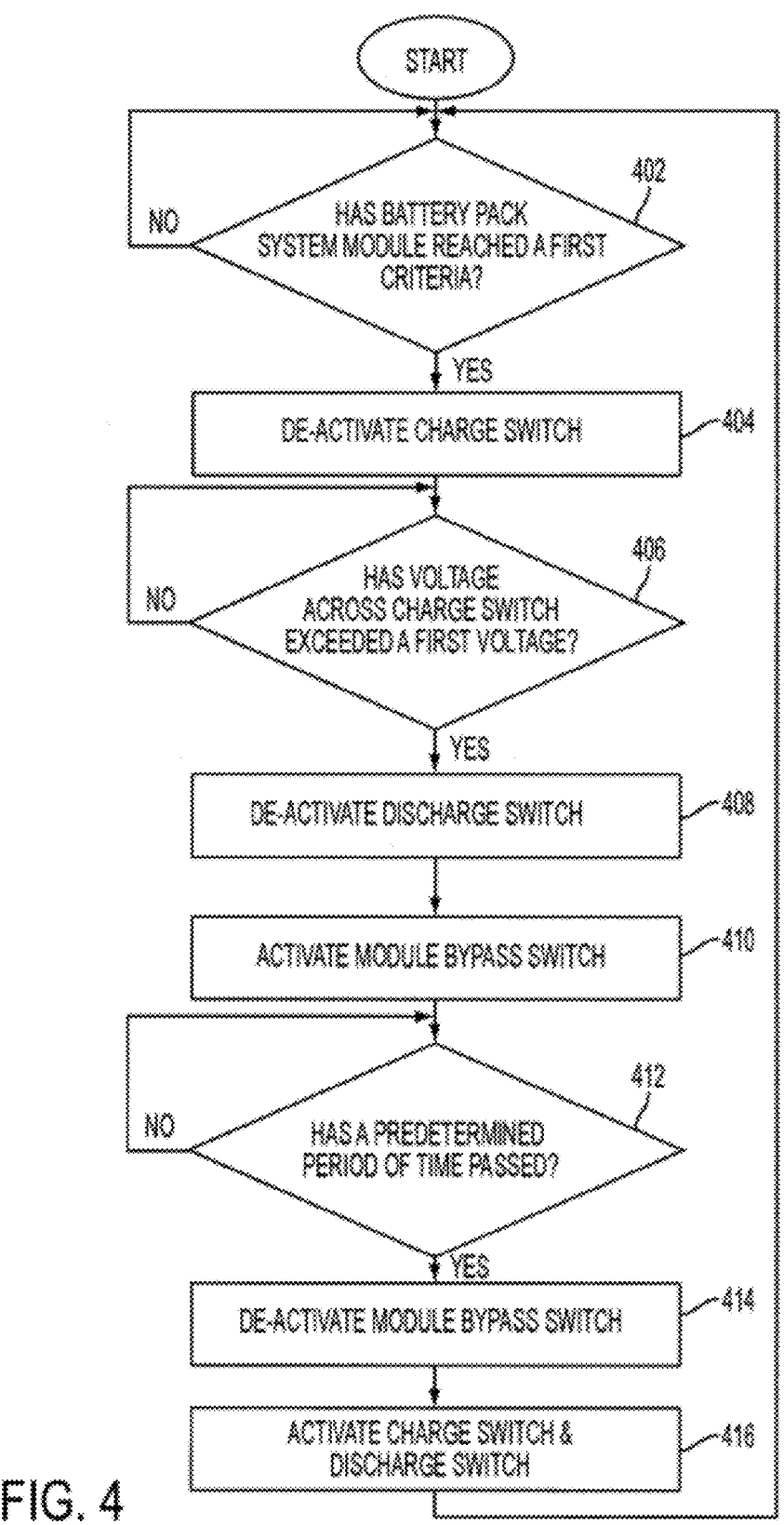
FIG. 4 is a flow chart illustrating an exemplary method of charging a battery pack system module according to one embodiment.

FIG. 4 is a flow chart illustrating an exemplary method of charging a battery pack system module according to one embodiment. A flow chart 400 begins at block 402 by determining if the battery pack system module has reached a first criteria. According to one embodiment, the first criteria is a level of charge. According to other embodiments, the first criteria may be a battery cell temperature, a battery cell voltage, or other measurable characteristics of the battery cell. If the first criteria is not reached, the flow chart returns to block 402 until the first criteria is met.

When the first criteria is reached, the charge switch is de-activated at block 404. At block 406, the voltage across the charge switch is determined to exceed a first voltage value. If the charge switch has not exceeded a certain voltage value, the flow chart returns to block 406. According to one embodiment, the voltage value for testing may be determined from the voltage of the power supply, the voltage of the battery pack system modules in the battery pack system, and/or the number of battery pack system modules. After the charge switch voltage exceeds a certain voltage value, the discharge switch is de-activated at block 408 and a module bypass switch is activated at 410. Thus, charge current is allowed to pass through the battery pack system module through a low resistance path without discharging the battery cells of the module.

A timer may be started after activating the module bypass switch, and, when a certain time period has passed at block 412, the module bypass switch is de-activated at block 414. The charge switch and discharge switch may be re-activated at block 416.

Figure 5:
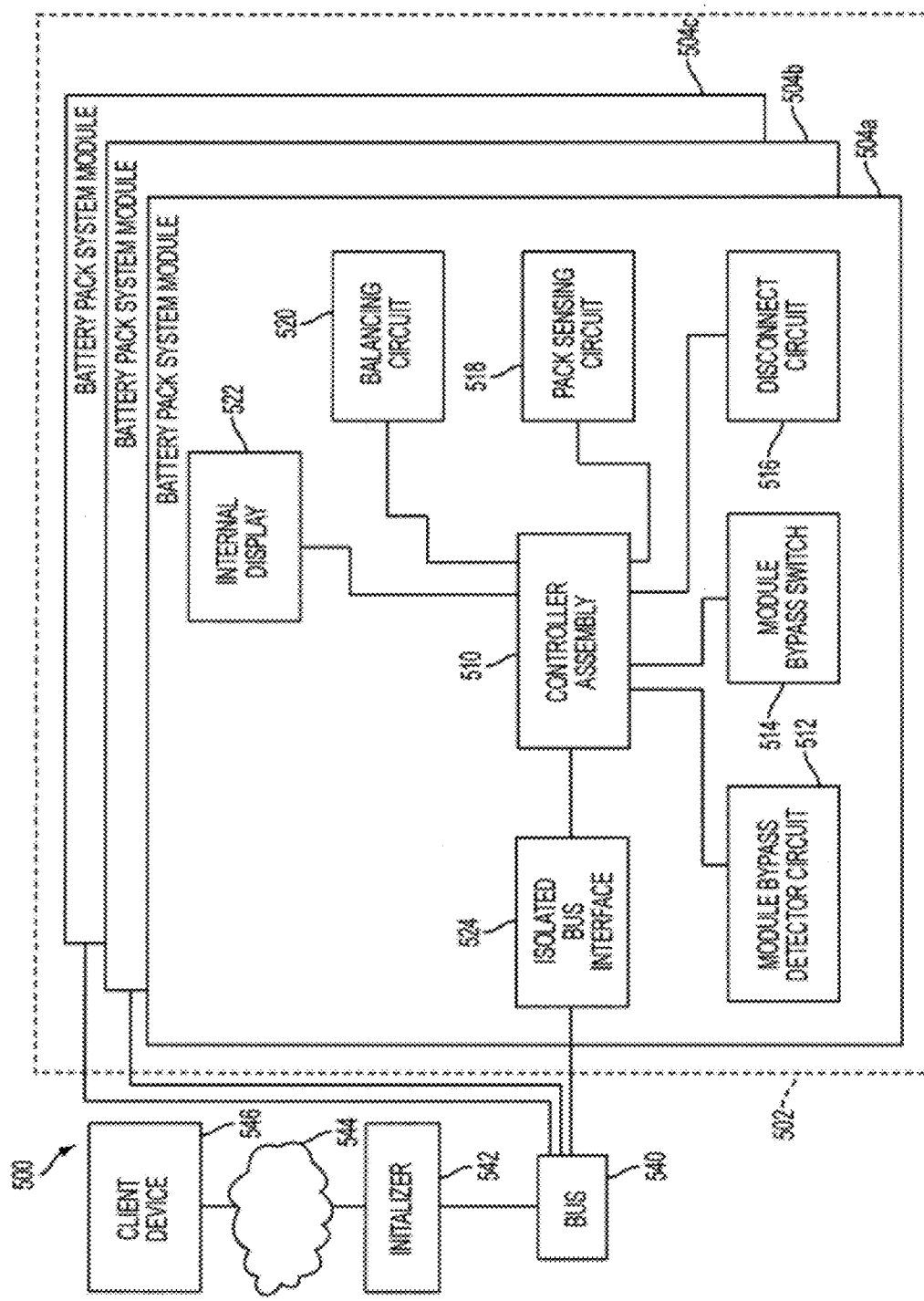
FIG. 5 is a block diagram illustrating an exemplary battery pack system having inter-module communication according to one embodiment.

The method of FIG. 4 provides for inter-module balancing of a battery system by allowing a battery pack system module to have autonomous control over charging of battery cells within each respective battery pack system module without communication to a central computer. According to another embodiment, the battery pack system module may be in communication with an initializer, such as a microcontroller, for controlling the balancing of battery pack system modules within a battery pack system. FIG. 5 is a block diagram illustrating an exemplary battery pack system having a plurality of battery pack system modules according to one embodiment.

A system 500 includes a battery pack system 502 having battery pack system modules 504a, 504b, 504c. The battery pack system module 504a includes a controller assembly 510 for interfacing with a bus 540 and components within the battery pack system module 504a. The controller assembly 510 may include analog controllers, digital controllers, and/or microprocessors. According to one embodiment, the battery pack system module 504a includes an isolated bus interface 524 for isolating the battery pack system module 504a from the bus 540, which may be operating at a different potential.

The controller assembly 510 may interface with a module bypass detector circuit 512 and module bypass switch 514. By sensing an output from the module bypass detector circuit 512, the controller assembly may determine when to active and de-activate the module bypass switch 514 and a disconnect circuit 516. The disconnect circuit 516 may include a charge switch and a discharge switch. The controller assembly 510 may also interface with a pack sensing circuit 518 and the disconnect circuit 516. The pack sensing circuit 518 may report to the controller assembly 510 characteristics of battery cells (not illustrated) located within the battery pack system module 504a. For example, the pack sensing circuit 518 may monitor charge levels of the battery cells with Coulomb counters or battery cell temperatures with thermistors.

The coulomb counters and/or thermistors may interface with the controller assembly 510 through an analog/digital converter (ADC). The controller assembly 510 may use information obtained from the pack sensing circuit 518 to determine activation and de-activation of a charge switch and a discharge switch within the disconnect circuit 516.

Additionally, the battery pack system module 504a may include an internal display 522 to communicate with an operator of the battery pack system 502 a status of the battery pack system module 504a. For example, the battery pack system module 504a may include a light emitting diode (LED) indicating the status of the module bypass switch 514. In another example, the internal display 522 may be a liquid crystal display (LCD) indicating the charge level of battery cells within the battery pack system module 504a.

An initializer 542 coupled to the bus 540 may communicate with each of the battery pack system modules 504a, 504b, 504c. The initializer 542 may accumulate information from each of the battery pack system modules 504a, 504b, 504c to make decisions regarding the charging operation of the battery pack system modules 504a, 504b, 504c. For example, by monitoring the charge levels of the different battery pack system modules 504a, 504b, 504c, the initializer 542 may instruct an unbalanced battery pack system module to activate the module bypass switch. According to one embodiment, the initializer 542 may be coupled to an external display device (not shown) for displaying the status of the battery pack system 502 and/or receiving operator commands for the battery pack system 502. The initializer 542 may monitor the battery pack system 502 for one or more events such as, for example, health of the battery cells, capacity of the battery cells, overcharge, over discharge, over current, short circuit current, over temperature, under temperature, state of charge of the battery cells, and/or balance of the battery cells. According to one embodiment, the initializer 542 may be programmed with new computer instructions or configuration settings through, for example, a flash update to an EEPROM chip storing computer instructions in the initializer 542.

According to one embodiment, the initializer 542 may have control of all internal cell balancing circuits within a module for intra-module balancing as well as control over the module bypass switch for each of the modules for inter-module balancing. Thus, the initializer may perform inter-module balancing and intra-module balancing. The combination of inter-module balancing and intra-module balancing allows continuous balancing in any battery mode including charge mode, discharge mode, quiescent mode, and storage mode. For example, when modules are unbalanced, if inter-module balancing is unavailable, intra-module balancing may be performed to balance the modules with one charge cycle. According to one embodiment, the initializer 542 may activate all balancing circuits in a module in order to balance the module with other modules.

The initializer 542 may be coupled to a network 544 for communicating with a client device 546. The initializer 542 may allow the client device 546 to monitor conditions within each of the battery pack system modules 504a, 504b, 504c and/or control components within the battery pack system modules 504a, 504b, 504c. For example, an operator at the client device 546 may instruct the initializer 542 to activate the module bypass switch 514 of the battery pack system module 504a. In another example, an operator at the client device 546 may adjust settings within the initializer 542 such as current limits, voltage limits, temperature limits, charge levels, and/or balancing settings.

According to one embodiment, the initializer 542 may be removed from the system 500 by designating the controller assembly 510 of the battery pack system module 504a, or another one of the battery pack system modules 504a, 504b, 504c, to function as a master controller. The master controller communicates with other battery pack system module controller assemblies and may provide access for an operator on a client device, an internal display, and/or an external display.

Figure 6:
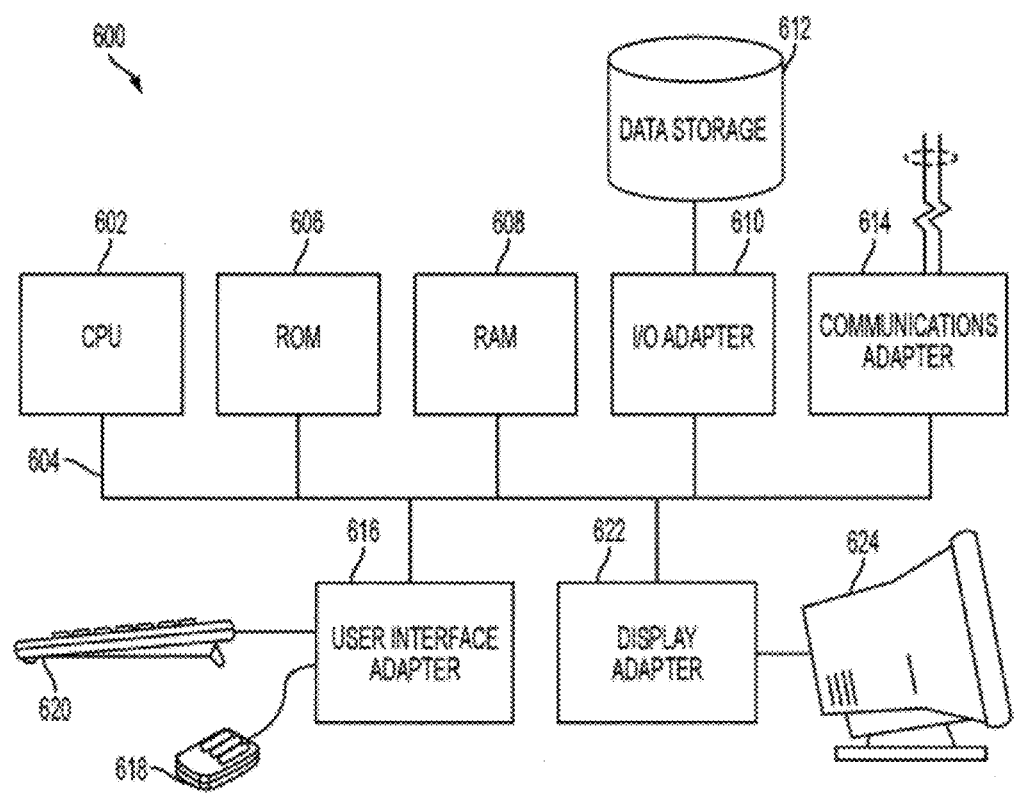
FIG. 6 is a block diagram illustrating an initializer for an exemplary battery pack system according to one embodiment.

FIG. 6 is a block diagram illustrating a client device for an exemplary battery pack system according to one embodiment. A computer system 600 includes a central processing unit (CPU) 602 coupled to a system bus 604. The CPU 602 may be a general purpose CPU or microprocessor, graphics processing unit (GPU), microcontroller, or the like. The present embodiments are not restricted by the architecture of the CPU 602 so long as the CPU 602, whether directly or indirectly, supports the modules and operations as described herein. The CPU 602 may execute the various logical instructions according to the present embodiments. Logical instructions may be stored in the CPU 602, in a battery pack system module (not shown), or in an initializer (not shown).

The computer system 600 may also include random access memory (RAM) 608, which may be, for example, SRAM, DRAM, SDRAM, or the like. The computer system 600 may use RAM 608 to store the various data structures used by a software application having code to electronically monitor and control battery pack system modules. The computer system 600 may also include read only memory (ROM) 606 which may be PROM, EPROM, EEPROM, optical storage, or the like. The ROM may store configuration information for booting the computer system 600. The RAM 608 and the ROM 666 hold user and system data.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600 in order to input operating parameters for a battery pack system module. In a further embodiment, the display adapter 622 may display a graphical user interface for monitoring and/or controlling battery pack system modules.

The I/O adapter 610 may connect one or more storage devices 612, such as one or more of a hard drive, a compact disk (CD) drive, a floppy disk drive, and a tape drive, to the computer system 600. The communications adapter 614 may be adapted to couple the computer system 600 to a network, which may be one or more of a LAN, WAN, and/or the Internet. The user interface adapter 616 couples user input devices, such as a keyboard 620 and a pointing device 618, to the computer system 600. The display adapter 622 may be driven by the CPU 602 to control the display on the display device 624.

The applications of the present disclosure are not limited to the architecture of computer system 600. Rather the computer system 600 is provided as an example of one type of computing device that may be adapted to perform the functions of a client device 546. For example, any suitable processor-based device may be utilized including without limitation, personal data assistants (PDAs), tablet computers, smartphones, computer game consoles, or multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

Figure 7:
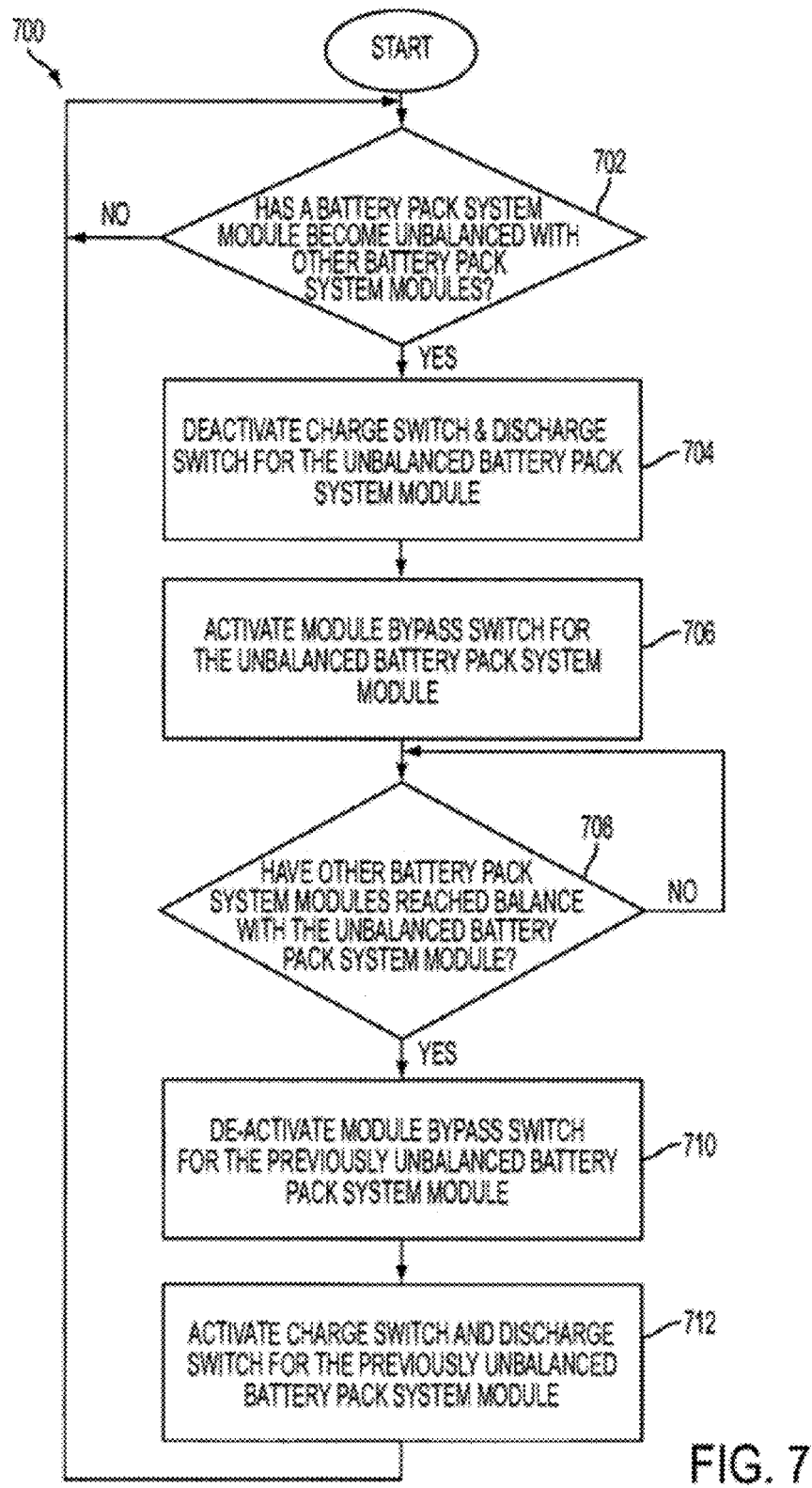
FIG. 7 is a flow chart illustrating an exemplary method of charging a battery pack system according to one embodiment.

External control of a battery pack system with an initializer may be performed when the initializer communicates with controller assemblies within the battery pack system modules. FIG. 7 is a flow chart illustrating an exemplary method of charging a battery pack system according to one embodiment. A flow chart 700 begins at block 702 where an initializer decides if a battery pack system module has become unbalanced with other battery pack system modules within a battery pack system. In one example, the battery pack system module may be determined to be charged to a higher level than other battery pack system modules in the battery pack system. If a battery pack system is unbalanced the flow chart continues to block 704. At block 704 the charge switch in the unbalanced battery pack system module may be de-activated to prevent further charging of battery cells within the unbalanced battery pack system module. Additionally, at block 704 the discharge switch is de-activated to prevent shorting of the battery cells when the module bypass switch is activated. At block 706 the module bypass switch for the unbalanced battery pack system module is activated.

At block 708 it is determined if the battery pack system modules have reached a balanced state with the unbalanced battery pack module. When balance is reached, the flow chart continues to block 710. At block 710 the module bypass switch for the previously unbalanced battery pack system module is de-activated. At block 712 the charge switch and the discharge switch for the previously unbalanced battery pack system module are activated. The method illustrated in FIG. 7 may be performed by an initializer, a client device, or a battery pack system module configured as a master module to control other modules. When the initializer, client device, or master module is coupled to a display or a client device, software may be executed to display a user interface for monitoring and/or controlling the battery pack system.

Figure 8:
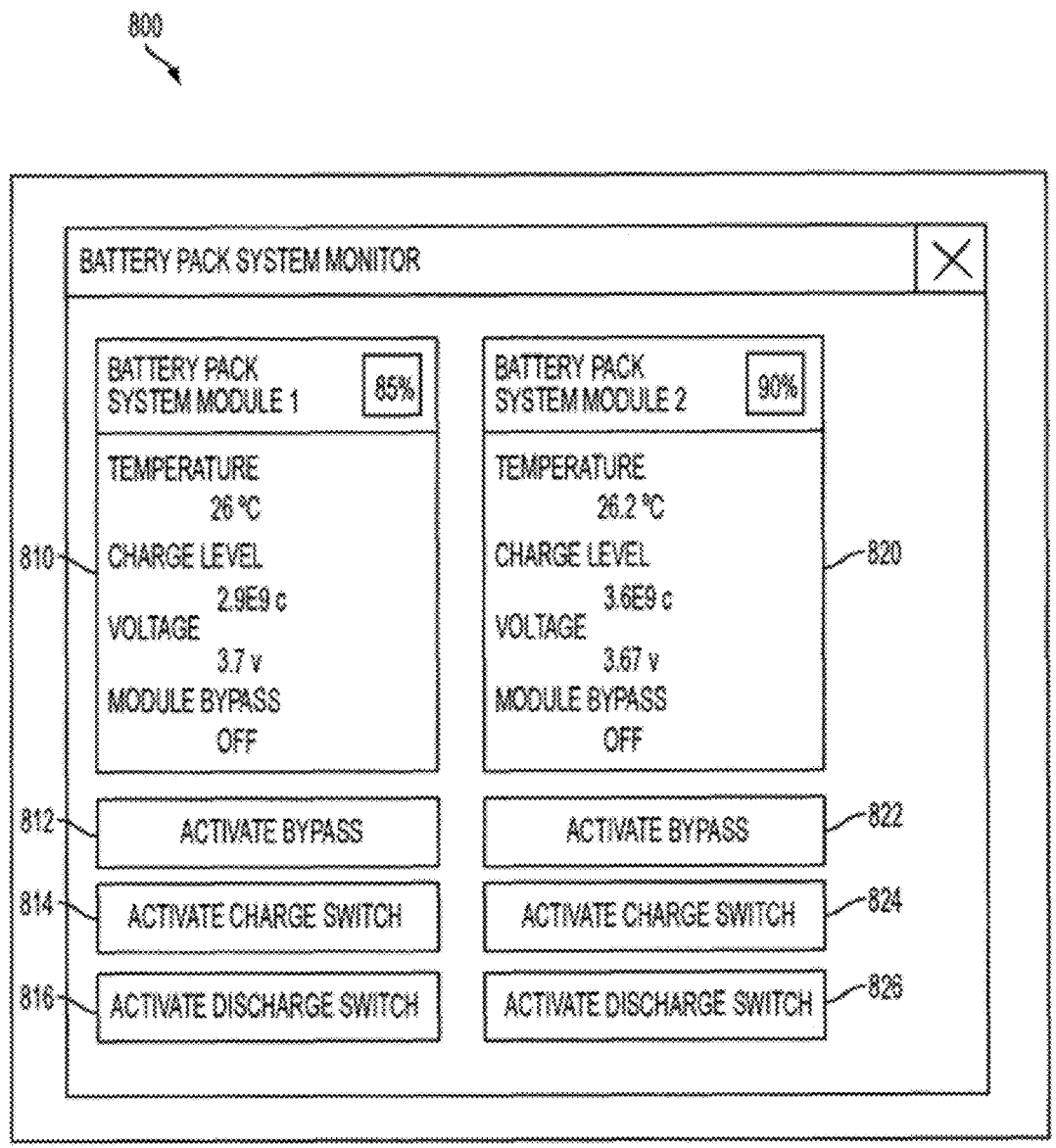
FIG. 8 is a block diagram illustrating a software application for monitoring a battery pack system according to one embodiment.

FIG. 8 is a block diagram illustrating a software application for monitoring a battery pack system according to one embodiment. A software application 800 may include displays 810, 820 for monitoring battery pack system modules inside of a battery pack system. The displays 810, 820 may include information such as, for example, temperature, charge level, voltage, and/or status of the module bypass switch for each battery pack system module in the battery pack system. Additionally, the software application 800 may include buttons 812, 822 for activating module bypass switches within the battery pack system modules monitored in displays 810, 820, respectively. Charge switches and/or discharge switches may be activated and de-activated automatically by the software when the buttons 812 and 822 are actuated. According to one embodiment, the display also includes separate buttons 814 and 824 for activating and de-activating a charge switch of each module and buttons 816 and 826 for activating and de-activating a discharge switch of each module. The software application 800 may be stored on a computer readable medium such as, for example, a compact disc (CD), a hard disk drive (HDD), a digital versatile disc (DVD), flash memory, or the like.

The battery pack system of the present disclosure allows balancing of battery pack system modules within the battery pack system with a module bypass switch, charge switch, and discharge switch. The balancing process may be performed continuously through charging of the battery pack system modules resulting in increased life from the battery pack system modules and reduced safety hazards from unbalanced battery pack system modules. Balancing times may be reduced with the module bypass switch, charge switch, and discharge switch because of higher charging current passing through the modules. The faster balancing times may be achieved with little or no additional heat dissipation in the batter pack system module. Reducing the heat dissipation prevents dangerous conditions from developing in the battery pack system module.

Faster balancing may be particularly advantageous when replacing battery pack system modules. For example, if one of the battery pack system modules is replaced, the replacement battery pack system module may be rapidly brought into balance with other battery pack system modules by activating module bypass switches, charge switches, and discharge switches to direct charge current to the unbalanced battery pack system modules.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising:
   a first battery pack system module, comprising:
   a plurality of battery cells coupled between a first terminal and a second terminal;
   a charge switch coupled in series with the plurality of battery cells and the first terminal for interrupting charging of the plurality of battery cells;
   a discharge switch coupled in series with the charge switch and the first terminal for interrupting discharging of the plurality of battery cells;
   a module bypass switch for shorting the first terminal and the second terminal, wherein the charge switch and the discharge switch are between the module bypass switch and the plurality of battery cells;
   a detection circuit for detecting a voltage across the charge switch; and
   a processor coupled to the module bypass switch and to the detection circuit, in which the processor is configured to:
   detect the battery pack system module has reached a first criteria;
   de-activate the charge switch after detecting the battery pack system module reached the first criteria;
   detect, from the detection circuit, when the voltage exceeds a first voltage after de-activating the charge switch;
   de-activate the discharge switch after detecting the voltage exceeds the first voltage; and
   autonomously activate, after detecting the voltage exceeds the first voltage, the module bypass switch to short the first terminal and the second terminal to provide charging current to a second battery pack system module.

2. The apparatus of claim 1, further comprising a zener diode in series with a resistor, the zener diode and the resistor in parallel with the module bypass switch.

3. The apparatus of claim 1, in which the module bypass switch is a field effect transistor (FET).

4. The apparatus of claim 1, further comprising a second battery pack system module coupled in series with the first battery pack system module.

5. The apparatus of claim 1, further comprising:
a controller assembly coupled to the charge switch, the discharge switch, and the module bypass switch;
a bus coupled to the controller assembly; and
an initializer coupled to the bus.

6. The apparatus of claim 5, further comprising a pack sensing circuit coupled to the controller assembly.

7. The apparatus of claim 5, further comprising a fuse coupled between the discharge switch and the battery cell.

8. The apparatus of claim 5, further comprising an isolated bus interface coupled between the bus and the controller assembly.

9. The apparatus of claim 1, wherein the charge switch comprises a field effect transistor (FET) having a body diode oriented to block a charge current received at the first terminal from reaching the plurality of battery cells while the charge switch is de-activated, and wherein the discharge switch comprises a field effect transistor (FET) having a body diode oriented to block discharge current from the plurality of battery cells.

10. A method, comprising:
charging a plurality of battery cells of a first battery pack system module with a charging current;
detecting, by the first battery pack system module during the charging, that the first battery pack system module has reached a first criteria;
stopping charging, by the first battery pack system module, of the first battery pack system module after detecting the first battery pack system module has reached the first criteria by de-activating a charge switch of the first battery pack system module;
detecting, by the first battery pack system module, that a voltage across the charge switch of the first battery pack system module exceeds a first voltage after deactivating the charging switch;
stopping discharging, by the first battery pack system module, of the first battery pack system module, after detecting the voltage exceeds the first voltage, by de-activating a discharge switch of the first battery pack system module coupled between a module bypass switch and the plurality of battery cells; and
activating, autonomously by the first battery pack system module, the module bypass switch to pass the charging current through the first battery pack system module to a second battery pack system module without charging the first battery pack system module after detecting the voltage exceeds the first voltage.

11. The method of claim 10, in which the first criteria is a first level of charge.

12. The method of claim 10, further comprising charging the second battery pack system module with the charging current, in which the second battery pack system module is in series with the first battery pack system module.

13. The method of claim 10, further comprising:
detecting, while the module bypass switch is active, that a second criteria is reached;
de-activating the module bypass switch after detecting that the second criteria is reached; and
charging the first battery pack system module with the charging current after detecting that the second criteria is reached.

14. The method of claim 13, in which the second criteria is a pre-determined period of time passing after activating the module bypass switch.

15. The method of claim 10, wherein the charge switch comprises a field effect transistor (FET) having a body diode oriented to block a charge current received at the first terminal from reaching the plurality of battery cells while the charge switch is de-activated, and wherein the discharge switch comprises a field effect transistor (FET) having a body diode oriented to block discharge current from the plurality of battery cells.

16. A computer program product, comprising:
a non-transitory computer-readable medium comprising:
code to monitor a first battery pack system module having a plurality of battery cells;
code to disable charging of the first battery pack system module when a first criteria is met by de-activating a charge switch of the first battery pack system module;
code to detect a voltage across the charge switch of the first battery pack system module exceeds a first voltage after de-activating the charge switch;
code to disable discharging of the first battery pack system module when the voltage exceeds the first voltage by de-activating a discharge switch of the first battery pack system module;
code to autonomously enable passing charge current through the first battery pack system module to a second battery pack system module after detecting the voltage exceeds the first voltage by activating a module bypass switch in the first battery pack system module, wherein the discharge switch is coupled between the module bypass switch and the plurality of battery cells; and
code to re-enable charging of the first battery pack system module when a second criteria is met.

17. The computer program product of claim 16, in which the medium further comprises:
code to monitor at least the second battery pack system module; and
code to enable charging of the second battery pack system module when charging of the first battery pack system module is disabled.

18. The computer program product of claim 16, in which the medium further comprises code to remotely monitor the charging of the first battery pack system module.

19. The computer program product of claim 16, in which the medium further comprises code to activate balancing circuits of the first battery pack system module to perform intra-module balancing.

* * * * *